United States Patent
Feng et al.

(10) Patent No.: US 12,467,860 B2
(45) Date of Patent: Nov. 11, 2025

(54) MONITORING AND CONTROL OF UNWANTED POLYMER BY-PRODUCT GENERATED IN MONOMERS PRODUCTION, STORAGE, AND HANDLING USING INFRARED SPECTROSCOPY ANALYSIS

(71) Applicant: BL Technologies, Inc., Minnetonka, MN (US)

(72) Inventors: Chaowei Feng, Tomball, TX (US); Eric Le, Tomball, TX (US); Bryan Crom, Tomball, TX (US); Nimeshkumar Patel, Tomball, TX (US)

(73) Assignee: BL Technologies, Inc., Minnetonka, MN (US)

( * ) Notice: Subject to any disclaimer, the term of this patent is extended or adjusted under 35 U.S.C. 154(b) by 238 days.

(21) Appl. No.: 18/270,401

(22) PCT Filed: Dec. 21, 2021

(86) PCT No.: PCT/US2021/064496
§ 371 (c)(1),
(2) Date: Jun. 29, 2023

(87) PCT Pub. No.: WO2022/146764
PCT Pub. Date: Jul. 7, 2022

(65) Prior Publication Data
US 2024/0060884 A1 Feb. 22, 2024

Related U.S. Application Data

(60) Provisional application No. 63/131,529, filed on Dec. 29, 2020.

(51) Int. Cl.
*G01N 21/3563* (2014.01)
*G01N 21/35* (2014.01)

(52) U.S. Cl.
CPC . *G01N 21/3563* (2013.01); *G01N 2021/3595* (2013.01)

(58) Field of Classification Search
CPC ....... G01N 21/3563; G01N 2021/3595; G01N 2021/0118; G01N 2021/8416; G01N 21/35; G01N 21/3577
See application file for complete search history.

(56) References Cited

U.S. PATENT DOCUMENTS 5,151,474 A * 9/1992 Lange .................. B01J 19/0006
526/60
5,232,560 A * 8/1993 Bell ........................ C08F 20/54
523/215
6,864,331 B1 3/2005 Reimers et al.

FOREIGN PATENT DOCUMENTS

KR 20190057565 A * 5/2019

OTHER PUBLICATIONS

International Search Report and Written Opinion, dated Apr. 5, 2022, received in connection with corresponding International Patent Application No. PCT/US2021/064496.
(Continued)

*Primary Examiner* — Kiho Kim
(74) *Attorney, Agent, or Firm* — Meunier Carlin & Curfman LLC (57) ABSTRACT

A method for monitoring and controlling unwanted polymer byproduct generated in a monomer production, storage, or handling process, for example polystyrene in a styrene production process, is described. The method comprises receiving a sample (115) taken during a monomer production process by a Fourier-Transform infrared spectrometer (120), performing an infrared spectroscopy analysis on the sample to generate spectral data (122) by the Fourier-Transform infrared spectrometer, and determining a percent- (Continued)

age (119) of at least one polymer in the sample by mathematical correlative processing of the spectral data by a computing device (110).

20 Claims, 7 Drawing Sheets

(56) References Cited

OTHER PUBLICATIONS

Lousberg, H. H. A., et al., "On-line determination of the conversion in a styrene bulk polymerization batch reactor using near-infrared spectroscopy," Journal of Applied Polymer Science, vol. 84, No. 1, 2002, pp. 90-98.

Riovanto, R., "Near Infrared Spectroscopy in Food Analysis: Qualitative and Quantitative Approaches," retrieved on Oct. 6, 2016 from http://paduaresearch.cab.unipd.it/3330/1/Riovanto.pdf, 2011, pp. 30-31.

* cited by examiner

MONITORING AND CONTROL OF UNWANTED POLYMER BY-PRODUCT GENERATED IN MONOMERS PRODUCTION, STORAGE, AND HANDLING USING INFRARED SPECTROSCOPY ANALYSIS

CROSS-REFERENCE TO RELATED APPLICATIONS

This application is a U.S. National Stage application filed under 35 U.S.C. § 371 of PCT/US2021/064496, filed Dec. 21, 2021, which claims the benefit of priority to U.S. Provisional Application No. 63/131,529, filed Dec. 29, 2020, each of which is hereby incorporated herein by reference in their entirety.

BACKGROUND

During the monomer production process, such as styrene, unwanted polymer is generated due to thermal polymerization of styrene, and other reactive monomers. The amount of polymer depends on temperature, time, any catalysts/contaminants, and any other reactive monomers (e.g., divinylbenzene). The undesired polymer side-product can increase the viscosity of process stream and/or foul the process equipment and cause a number of processing, production, and product quality problems. Hence, it is crucial to monitor the amount of polymer generated in an accurate, quick, and quantitative manner in order to take predictive and proactive mitigative actions to minimize the issues. This has presented challenges to the producers of styrene, and other such reactive monomers.

SUMMARY

In one embodiment, characteristic peaks of polystyrene generated in styrene production and processing are detected using a Fourier-transform infrared spectroscopy ("FT-IR") analysis. The growth of polystyrene characteristic peaks is observed as a function of polymerization time. The peak area is correlated to polystyrene content in a linear relationship. Hence, the quantitative relationship between polystyrene content and polymerization time is built using FT-IR as the analytical tool. Significantly, this crucial relationship can be used to monitor the unwanted polymer generation in styrene production process as a function of time. The monitoring product derived from this invention can help styrene producers monitor and control the polymer byproduct generated in their processes quickly and quantitatively and take mitigative actions to minimize negative impact.

In an embodiment, a method for monitoring and controlling unwanted polymer byproduct generated in a monomer production, storage, or handling process is provided. The method includes: receiving a sample taken during a monomer production process by a computing device; performing an infrared spectroscopy analysis on the sample to generate spectral data by the computing device; determining a percentage of at least one polymer in the sample by mathematical correlative processing of the spectral data by the computing device.

Embodiments may include some or all of the following features. The monomer may include one of styrene, divinylbenzene, isoprene, butadiene, acrylonitrile, acrylic acid, methacrylic acid, acrolein, vinyl acetate, and vinyl chloride. The polymer may include one of polystyrene, poly divinylbenzene, polyisoprene, polybutadiene, poly(acrylonitrile), poly(acrylic acid), poly(methacrylic acid), polyacrolein, poly(vinyl acetate), and poly(vinyl chloride). The monomer may include styrene and the polymer comprises polystyrene. The method may further include identifying at least one peak in the spectral data; and calculating an area under the at least one peak. The at least one peak may be a peak of 2923 $cm^{-1}$. Determining the percentage of the at least one polymer in the sample by mathematical correlative processing of the spectral data may include: comparing the area to a monomer-specific calibration curve; and determining the percentage based on the comparison. The method may further include determining one or more remedial actions to perform on the monomer production process based on the determined percentage. The remedial actions may include one or more of adding a polymerization inhibitor to the monomer production process, adding a retarder to the production process, and adding a dispersant to the monomer production process. The computing device may include a Fourier-transform infrared spectrometer.

In an embodiment, a system is provided. The system includes: an infrared spectrometer; at least one computing device; and a memory storing computer-executable instructions. The computer-executable instructions, when executed by the at least one computing device, cause the at least one computing device to: receive a sample taken during a monomer production process; perform an infrared spectroscopy analysis on the sample to generate spectral data; determine a percentage of at least one polymer in the sample by mathematical correlative processing of the spectral data.

Embodiments may include some or all of the following features. The monomer may include one of styrene, divinylbenzene, isoprene, butadiene, acrylonitrile, acrylic acid, methacrylic acid, acrolein, vinyl acetate, and vinyl chloride. The polymer may include one of polystyrene, poly divinylbenzene, polyisoprene, polybutadiene, poly(acrylonitrile), poly(acrylic acid), poly(methacrylic acid), polyacrolein, poly(vinyl acetate), or poly(vinyl chloride). The monomer may include styrene and the polymer comprises polystyrene. The system may further include computer-executable instructions that when executed by the at least one computing device cause the at least one computing device to: identify at least one peak in the spectral data; and calculate an area under the at least one peak. The at least one peak may include a peak of 2923 $cm^{-1}$. Determining the percentage of at least one polymer in the sample by mathematical correlative processing of the spectral data may include: comparing the area to a monomer-specific calibration curve; and determining the percentage based on the comparison.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
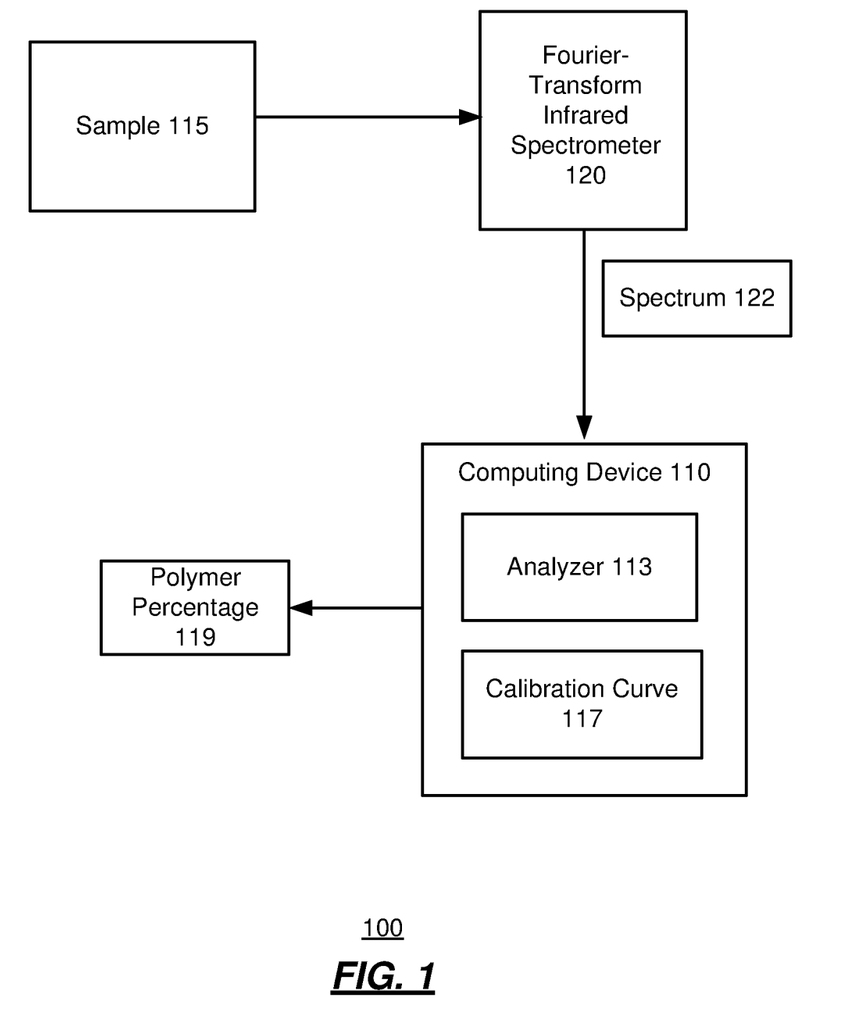
FIG. 1 is an illustration of an exemplary environment for determining polymer percentage in a monomer sample using an FT-IR analysis.

FIG. 1 is an illustration of an environment 100 for determining polymer percentages in monomers. Polymers are an unwanted byproduct in the production of monomers. For example, the polymer polystyrene may be created during the production of the monomer styrene. Example monomers include divinylbenzene, isoprene, butadiene, acrylonitrile, acrylic acid, methacrylic acid, acrolein, vinyl acetate, and vinyl chloride. Other monomers may be supported.

Excessive polymer production can lead to an increase in the viscosity of process stream, the fouling of equipment, and product contamination, and is therefore undesirable. Accordingly, it is desirable to monitor polymer generation during a monomer production process and take remedial actions such as the use of polymer inhibitors, retarders, and dispersants, and their combinations, in addition to changing process operating conditions.

One way to measure the percentage of polymers in a monomer such as styrene is methanol precipitation. However, such a measurement is time consuming (e.g., several hours) and therefore may not successfully help mitigate the issues due to presence of polymer.

Accordingly, in order to more quickly determine the percentage of a polymer in a monomer, the environment 100 includes a computing device 110 in communication with a Fourier-Transform infrared ("FT-IR") spectrometer 120. A suitable computing device 110 is the computing device 700 illustrated with respect to FIG. 7.

FT-IR is a technique used to obtain an infrared spectrum of absorption or emission of a sample material. The FT-IR spectrometer 120 collects high-resolution spectral data from a sample material over a wide spectral range.

The spectrometer 120 is adapted to receive a plurality of samples 115, and to generate FT-IR measurements from each sample 115. The FT-IR measurements generated by the spectrometer 120 for a sample 115 is represented in FIG. 1 as the spectrum 122. In some embodiments, the spectrum 122 is a graph of the values (i.e., spectral data) measured for a sample 115 at a plurality of discrete wavelengths. Depending on the embodiment, each sample 115 may contain more than one monomer along with polymer, and may also contain water. Each same may be taken during a monomer generation process.

In some embodiments, the computing device 110 may receive the spectrum 122. An analyzer 113 executed by the computing device 110 may then use the spectrum 122 to determine the percentage of the sample 115 that is polymer (i.e., the polymer percentage 119). In some embodiments, the analyzer 113 may determine the polymer percentage 119 using what is referred to herein as a calibration curve 117. The calibration curve 117 may be a mapping or correlation that relates particular peaks or wavelengths of the spectrum 122 to a percentage of polymer in the sample 115. Depending on the embodiment, each type of monomer may have its own calibration curve 117. An example calibration curve 117 for the monomer styrene is illustrated in the graph 400 of FIG. 4.

The analyzer 113 may have generated the calibration curve 117 for a particular monomer by taking the monomer, inhibiting thermal polymerization of the monomer, and then taking samples 115 from the monomer at a frequency as warranted by plant operating conditions, and potential for polymer formation. Depending on the embodiment, more or fewer samples may have been collected, and the analysis may be conducted on-site, off-line, or on-line.

Once each sample has been collected of the monomer, a spectrum 122 is created for each sample by the FT-IR spectrometer 120, and the percentage of polymer is determined for each sample 115 using conventional methods such as methanol precipitation. Other methods may be used.

Figure 2:
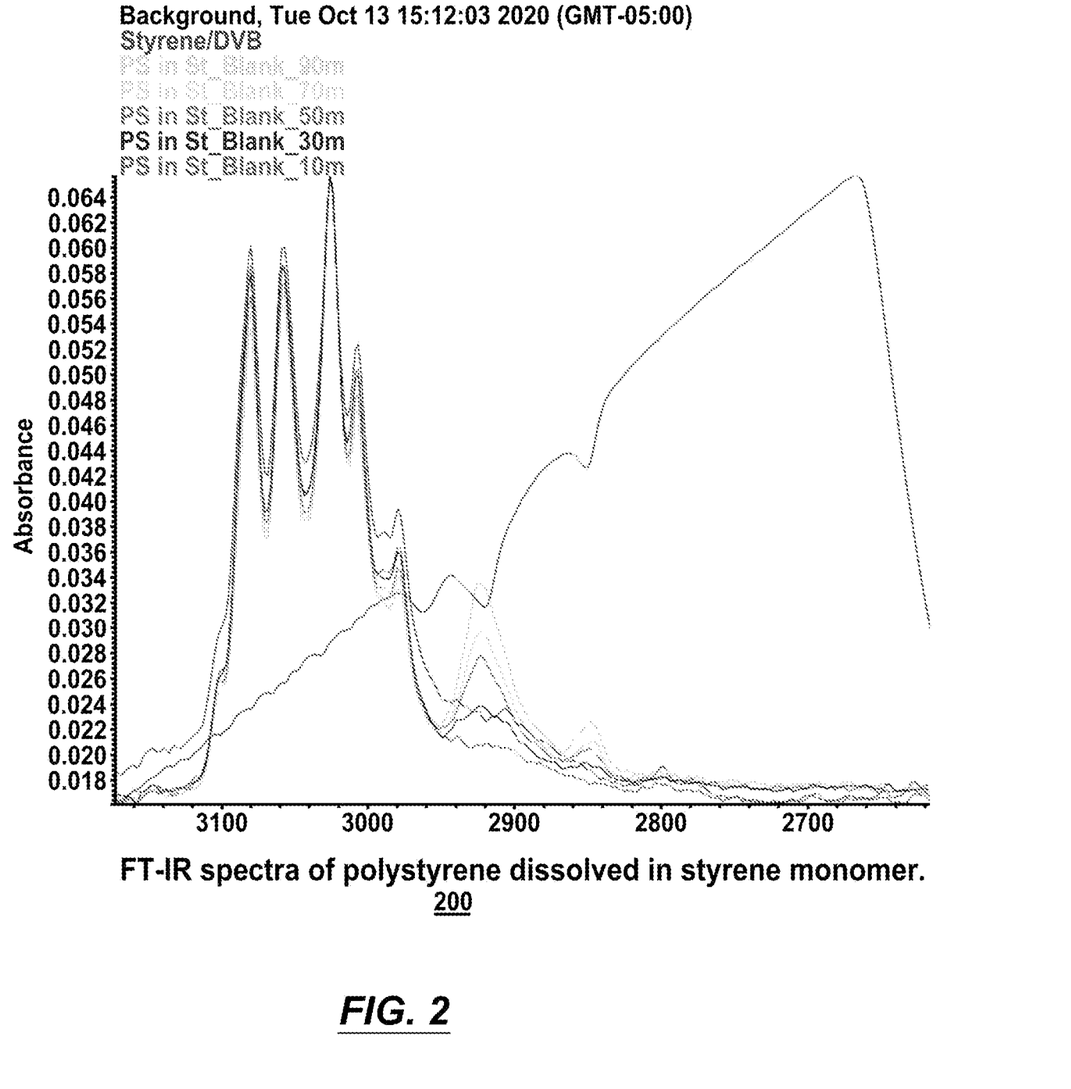
FIG. 2 is an illustration of a graph of FT-IR spectra of a monomer sample.

For example, FIG. 2 is an illustration of a graph 200 of a spectrum 122 of a sample 115. In the example shown, the monomer is styrene. As shown, the spectrum 122 includes several peaks corresponding to wavelengths measured by the spectrometer 120.

The spectrums 122 from each of the various samples 115 are then analyzed to determine a particular peak or wavelength whose area under the peak best correlates to the polymer percentages measured for each sample. In the case of styrene, the determined peak is at 2923 cm$^{-1}$. Other peaks or spectral data processing methods may be used. The determined peak or peaks may vary depending on the particular monomer being sampled.

For each sample 115, the area under the determined peak in the spectrum 122 is measured using integration and compared to the measured polymer percentage for that sample 115. The calculated areas and measured polymer percentages are then used to create the calibration curve 117 for the particular monomer. The calibration curve 117 may be determined using linear regression, for example. Other types of regression may be used.

Figure 3:
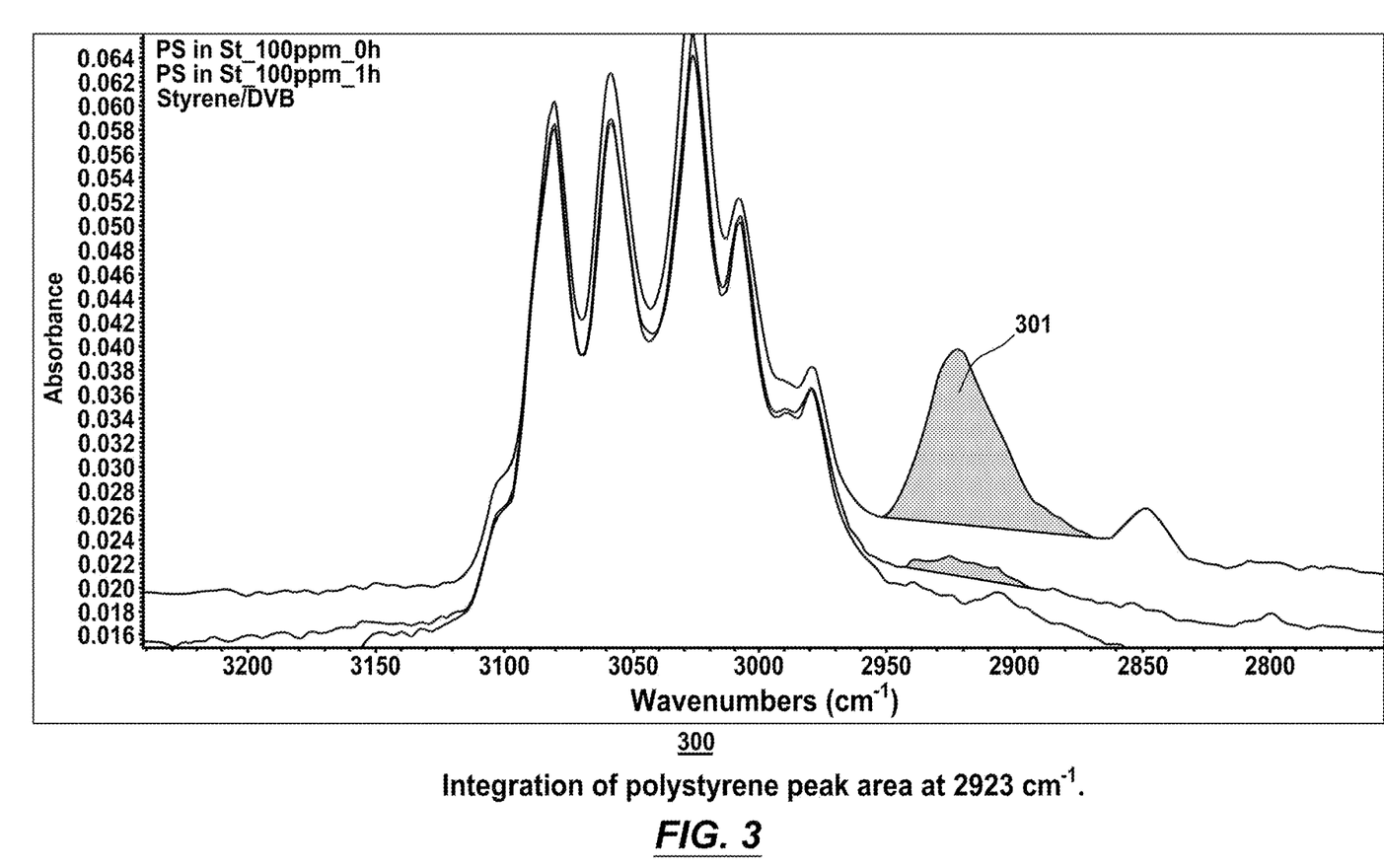
FIG. 3 is an illustration of a graph showing an integration of an FT-IR peak at 2923 cm$^{-1}$.

For example, FIG. 3 is another illustration of a graph 300 of a spectrum 122 generated from a sample 115 taken from a styrene generating process. In the example shown, the peak at 2923 cm$^{-1}$ has been integrated to obtain the area under the peak. The area under the peak is shown as the gray area 301. This area for the sample is used along with the measured polymer percentage for the sample 115 as data points for the calibration curve 117.

Figure 4:
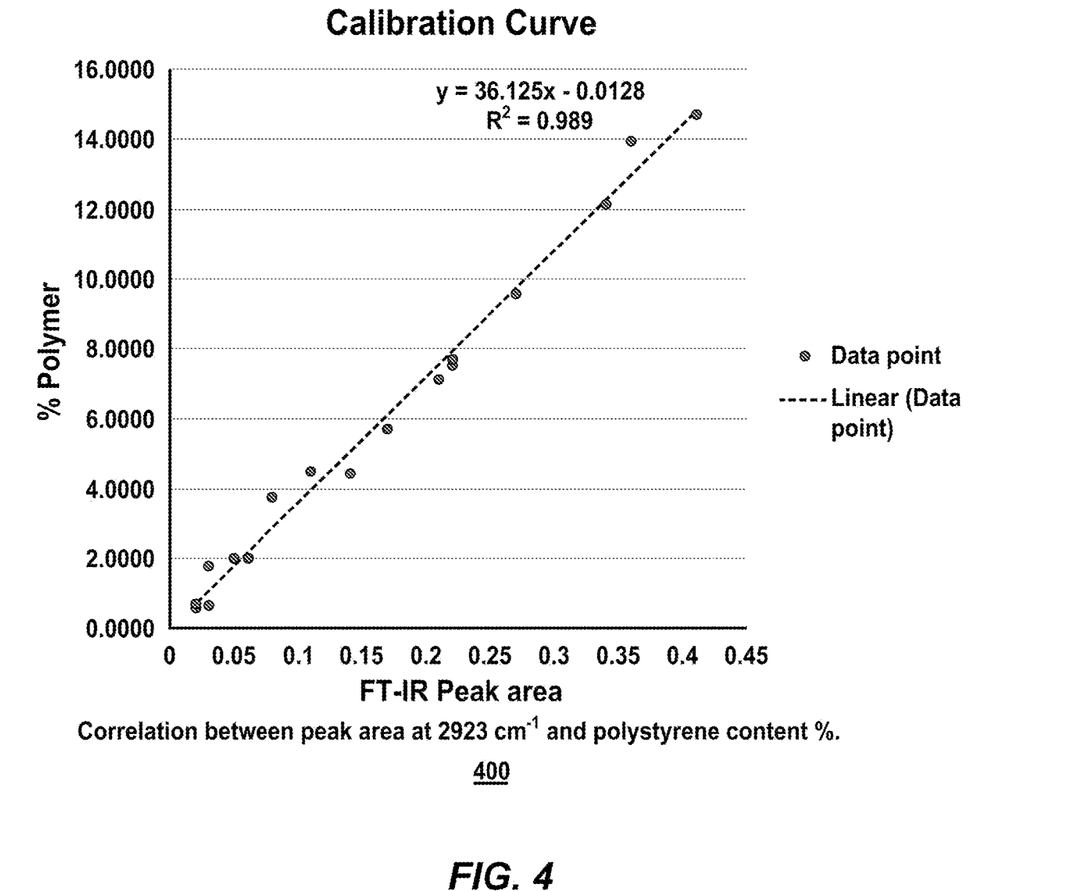
FIG. 4 is an illustration of a graph of a correlation curve showing the correlation between polymer percentage and peak area under the peak at 2923 cm$^{-1}$.

Finally, FIG. 4 is an illustration of a graph 400 of measured percentage of polymer versus the peak area measured for each sample 115. As shown, the peak area and the measured polymer percentage have a linear relationship. This graph 400 may be an example of a calibration curve 117 and may be used by the analyzer 113 to determine a polymer percentage for a monomer sample 115 given a spectrum 122 taken from the sample 115 by the spectrometer 120.

After generating the calibration curve 117 for a particular monomer, the analyzer 113 may receive a spectrum 122 for a sample 115 and may use the spectrum 122 to determine the area under the particular peak used for the sample 115 being tested (e.g., 2923 cm$^{-1}$). The determined area is then compared with the calibration curve 117 to determine the polymer percentage 119 for the sample 115.

The analyzer 113 and FT-IR spectrometer 120 combination as described herein provides many advantages over prior art polymer measurement techniques. One such advantage is for the improved prevention of polymer byproduct during monomer productions. For example, an entity who produces a monomer such as styrene may continuously (e.g., every minute, five minutes, or ten minutes) take samples 115 from their monomer production. Spectrums 122 are generated for each sample 115 by the FT-IR spectrometer 120 and provided to the analyzer 113 and the polymer percentage 119 is determined for each sample 115 using the associated spectrum 122 as described above. As soon as the polymer percentage 119 exceeds a threshold, or a rate of polymer percentage 119 increase between samples 115 exceeds a threshold, the entity may add or alter the chemical additive treatment program that may comprise polymerization inhibitor, retarder, and/or dispersant or their combinations, in order to minimize negative impact and/or optimize the total cost of the operation. As may be appreciated, the analyzer 113 and FT-IR spectrometer 120 combination may be sold separately, or together, to monomer producers for use in the prevention or reduction of polymer byproduct during monomer production.

As another advantage, the analyzer 113 and FT-IR spectrometer 120 combination may allow for the remote monitoring and control of monomer production. For example, a FT-IR spectrometer 120 may be placed at a client location and may receive samples 115 from a current monomer production. The spectrums 122 generated by the FT-IR spectrometer 120 for each sample 115 may be transmitted to a remote location that has contracted with the client to advise on monomer production. The spectrums 122 for each sample 115 may be transmitted to the remote location using a network such as the internet.

The analyzer 113 located at the remote location may receive the spectrums 122, and may use the spectrums 122, and the calibration curve 117 associated with the monomer being produced, to determine the polymer percentage 119 of each sample 115. The analyzer 113 may then provide the polymer percentages 119 determined for each sample 115 along with the current rate of change of the polymer percentage 119. The client 119 may then determine what remedial actions to take based on the received polymer percentages 119 and the current rate of change. The remedial actions may include adding a polymerization inhibitor to the monomer production process, adding a retarder to the production process, and adding a dispersant to the monomer production process.

As an additional service, the analyzer 113 may control the application of chemical additives at the client location. The analyzer 113, based on the polymer percentages 119 and/or current rate of change of the polymer percentages 119, may determine the type, dosage, and any combination of chemical additives should be applied to the current monomer production. The analyzer 113 may then remotely cause, using machinery installed at the client's location, one or more inhibitors to applied to the monomer production.

As another advantage, the analyzer 113 and FT-IR spectrometer 120 combination may allow for the improved testing of chemical additives, or other means for slowing or halting the formation of polymers during monomer production. For example, the analyzer 113 and FT-IR spectrometer 120 may determine the polymer percentages 119 in a monomer production at various times before and after an amount of chemical additive has been applied to the monomer. This may allow for chemical additives to be more closely tested and verified.

Figure 5:
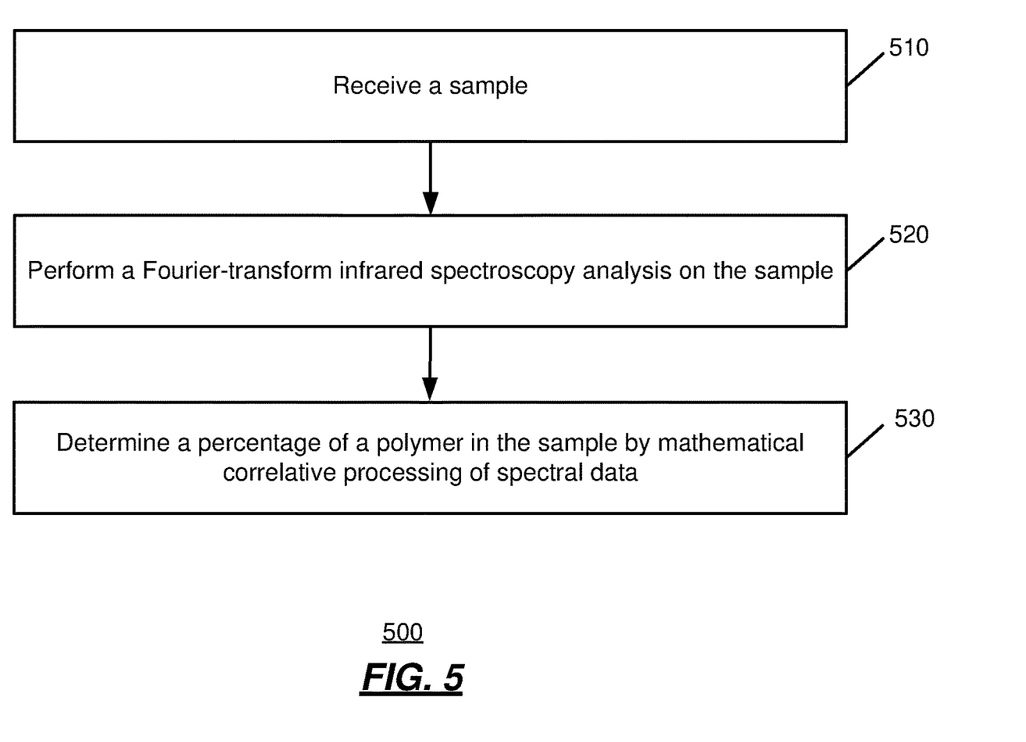
FIG. 5 is an illustration of a method for determining polymer percentage in a monomer sample using an FT-IR analysis.

FIG. 5 is an illustration of a method 500 for determining a polymer percentage for a sample 115 using a Fourier-transform infrared spectrometer. The method 500 may be performed by a computing device 110 and one or more spectrometers 120.

At 510, a sample is received. The sample 115 may be a monomer sample taken from a monomer generation process and may be received by an FT-IR spectrometer 120. The monomer may be styrene or another monomer such as divinylbenzene, isoprene, butadiene, acrylonitrile, acrylic acid, methacrylic acid, acrolein, vinyl acetate, or vinyl chloride. Other monomers may be supported. Depending on the embodiment, the sample 115 may be of a current monomer production process and may contain more than one monomer along with more than one polymer, and may also contain water.

At 520, an FT-IR analysis is performed on the received sample. The analysis may be performed by the FT-IR spectrometer 120. As part of the analysis, the FT-IR spectrometer 120 may generate a spectrum 122 from the sample 115. The spectrum 122 may comprise values measured for a set of wavelengths by the spectrometer 120.

At 530, a percentage of polymer in the sample is determined by mathematical correlative processing of spectral data. In some embodiments, the polymer percentage 119 may be determined by the analyzer 113: identifying at least one peak based on the analysis; determining an area under the selected peak using integration on the selected peak; and comparing the determined area to the calibration curve 117. For a monomer such as styrene the identified peak may be a wavelength such as 2923 $cm^{-1}$. For other monomers the analyzer 113 may consider different wavelengths.

The calibration curve 117 may be specific to the monomer that is being sampled and may be a mapping or function that relates the area under the selected peak to a polymer percentage 119. The determined polymer percentage 119 may be used for a variety of purposes such as selecting a remedial action to perform. The remedial action may include applying a polymer inhibitor to the monomer production process.

Figure 6:
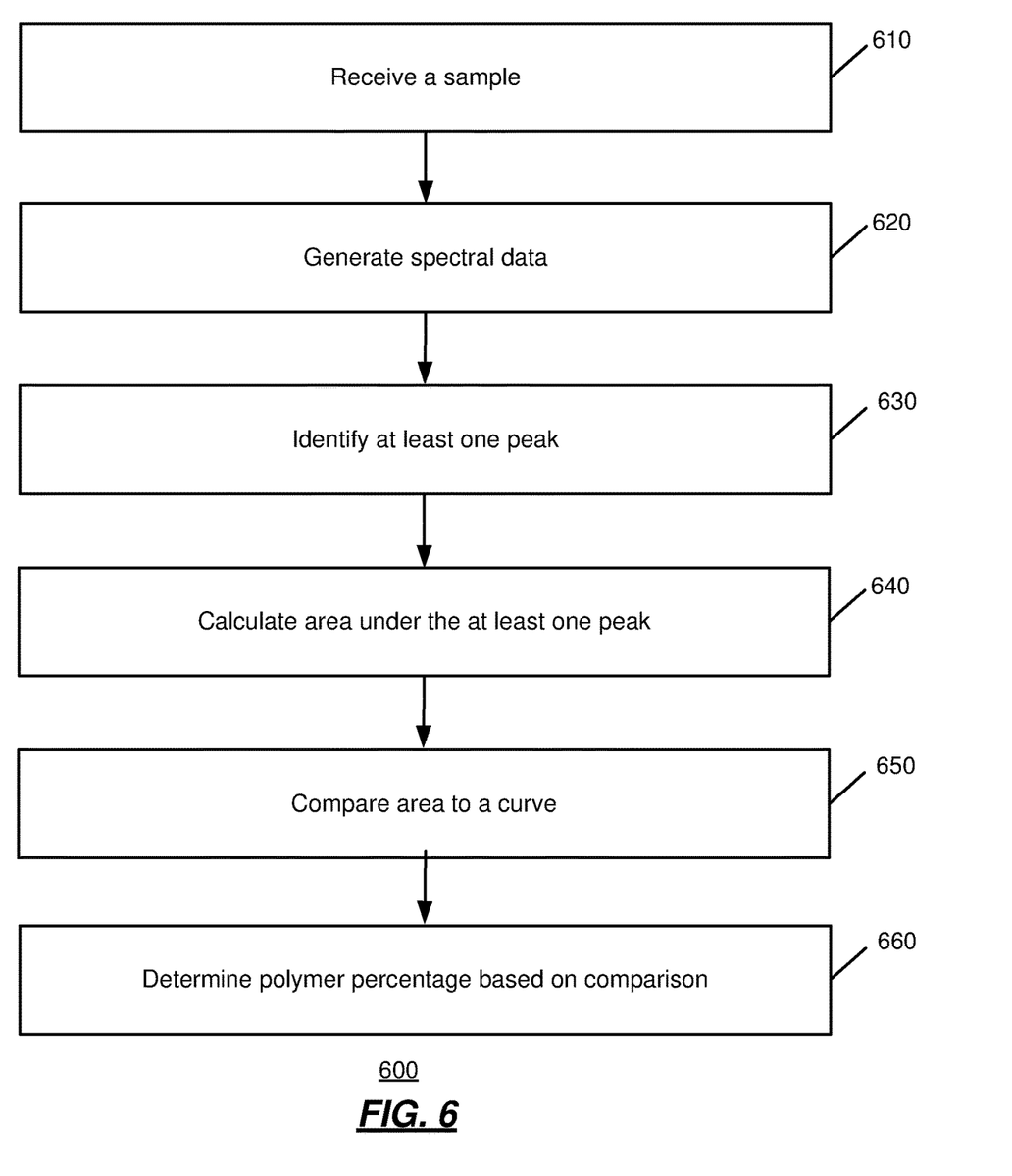
FIG. 6 is an illustration of a method for determining polymer percentage in a monomer sample using an FT-IR analysis.

FIG. 6 is an illustration of a method 600 for determining a polymer percentage for a sample 115 using a Fourier-transform infrared spectrometer. The method 600 may be performed by a computing device 110 and one or more spectrometers 120.

At 610, a sample is received. The sample 115 may be a monomer sample taken from a monomer generation process and may be received by an FT-IR spectrometer 120. The sample 115 may contain more than one monomer along with polymer, and may also contain water.

At 620, spectral data is generated. The spectral data may be part of a spectrum 122 generated by the FT-IR spectrometer 120. Depending on the embodiment, the spectral data may be a graph.

At 630, at least one peak is identified. The at least one peak may be identified by the analyzer 113. The particular peak that is identified may depend on the particular monomer that is being generated. Each monomer may be associated with a different peak. For example, for the monomer styrene, the peak may be at 2923 $cm^{-1}$.

At 640, an area under the at least one peak is calculated. The area under the at least one peak may be calculated by the analyzer 113 using integration, for example.

At 650, the area is compared to a monomer-specific calibration curve. The area may be compared to the monomer-specific calibration curve 117 by the analyzer 113. The calibration curve 117 may be specific to the polymer being investigated such as styrene. The curve 117 may have been previously determined by measuring concentrations of the particular polymer during different stages of the monomer production process along with the spectra data.

At 660, a percentage of the at least one polymer in the sample is determined based on the comparison. The percentage may be determined by the analyzer 113.

Figure 7:
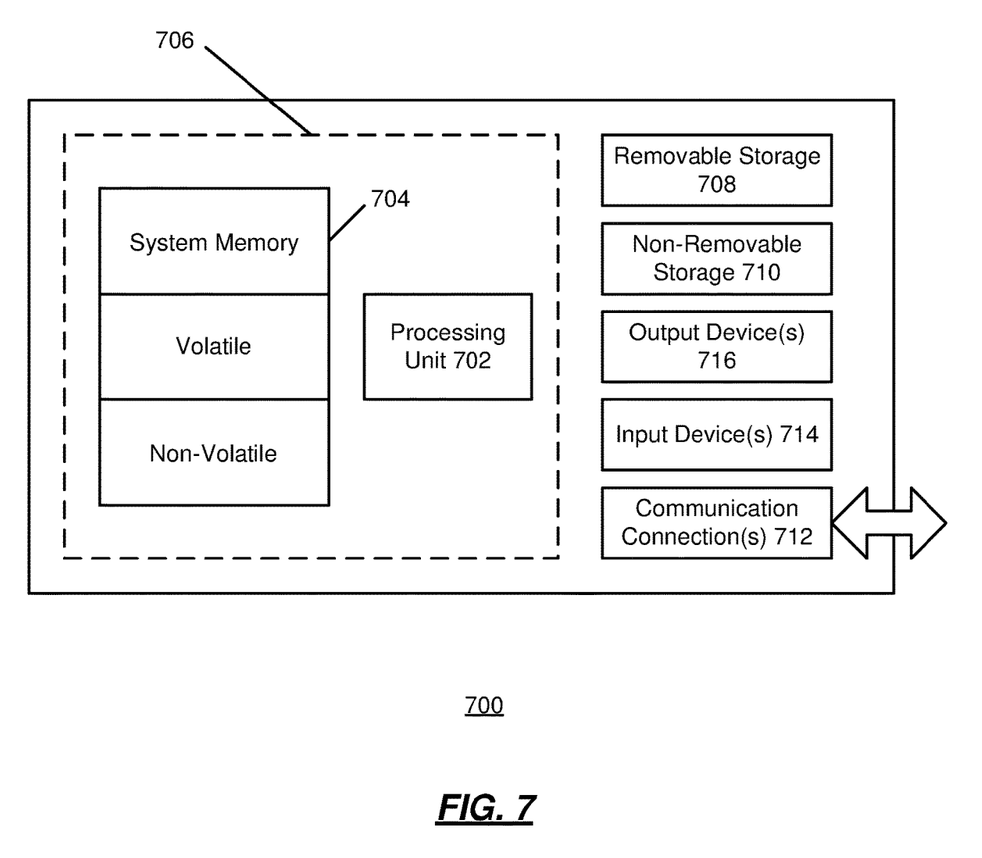
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for monitoring and controlling unwanted polymer by product generated in a monomer production, storage, or handling process, comprising:
receiving a sample taken during a monomer production process;
performing an infrared spectroscopy analysis on the sample to generate spectral data by a computing device;
determining a percentage of at least one polymer in the sample by mathematical correlative processing of the spectral data by the computing device, wherein the at least one polymer is an unwanted polymer that is generated during the monomer production process due to thermal polymerization of the monomer.

2. The method of claim 1, wherein the monomer comprises one of styrene, divinylbenzene, isoprene, butadiene, acrylonitrile, acrylic acid, methacrylic acid, acrolein, vinyl acetate, and vinyl chloride.

3. The method of claim 1, wherein the polymer comprises one of polystyrene, poly divinylbenzene, polyisoprene, polybutadiene, poly(acrylonitrile), poly(acrylic acid), poly(methacrylic acid), polyacrolein, poly(vinyl acetate), and poly(vinyl chloride).

4. The method of claim 1, wherein the monomer comprises styrene and the polymer comprises polystyrene.

5. The method of claim 1, further comprising identifying at least one peak in the spectral data; and calculating an area under the at least one peak.

6. The method of claim 5, wherein the at least one peak comprises a peak of 2923 $cm^{-1}$.

7. The method of claim 5, wherein determining the percentage of the at least one polymer in the sample by mathematical correlative processing of the spectral data comprises:
   comparing the area to a monomer-specific calibration curve; and
   determining the percentage based on the comparison.

8. The method of claim 1, further comprising: determining one or more remedial actions to perform on the monomer production process based on the determined percentage.

9. The method of claim 8, wherein the remedial actions comprise one or more of adding a polymerization inhibitor to the monomer production process, adding a retarder to the production process, and adding a dispersant to the monomer production process.

10. The method of claim 1, wherein the computing device comprises a Fourier-transform infrared spectrometer.

11. A system comprising:
    an infrared spectrometer;
    at least one computing device; and
    a memory storing computer-executable instructions that when executed by the at least one computing device cause the at least one computing device to:
    perform an infrared spectroscopy analysis on a sample taken during a monomer production process to generate spectral data;
    determine a percentage of at least one polymer in the sample by mathematical correlative processing of the spectral data, wherein the at least one polymer is an unwanted polymer that is generated during the monomer production process due to thermal polymerization of the monomer.

12. The system of claim 11, wherein the monomer comprises one of styrene, divinylbenzene, isoprene, butadiene, acrylonitrile, acrylic acid, methacrylic acid, acrolein, vinyl acetate, and vinyl chloride.

13. The system of claim 12, wherein the polymer comprises one of polystyrene, poly divinylbenzene, polyisoprene, polybutadiene, poly(acrylonitrile), poly(acrylic acid), poly(methacrylic acid), polyacrolein, poly(vinyl acetate), or poly(vinyl chloride).

14. The system of claim 12, wherein the monomer comprises styrene and the polymer comprises polystyrene.

15. The system of claim 12, further comprising computer-executable instructions that when executed by the at least one computing device cause the at least one computing device to: identify at least one peak in the spectral data; and calculate an area under the at least one peak.

16. The system of claim 15, wherein the at least one peak comprises a peak of 2923 $cm^{-1}$.

17. The system of claim 15, wherein determining the percentage of at least one polymer in the sample by mathematical correlative processing of the spectral data comprises:
    comparing the area to a monomer-specific calibration curve; and
    determining the percentage based on the comparison.

18. The system of claim 17, further comprising determining one or more remedial actions to perform on the monomer production process based on the determined percentage.

19. The system of claim 17, wherein the remedial actions comprise adding a polymerization inhibitor to the monomer production process.

20. A method comprising:
    receiving a sample taken during a monomer production process;
    performing an infrared spectroscopy analysis on the sample to generate spectral data by a computing device;
    identifying at least one peak in the spectral data by the computing device;
    calculating an area under the at least one peak by the computing device;
    comparing the area to a monomer-specific calibration curve by the computing device; and
    determining a percentage of at least one polymer in the sample based on the comparison by the computing device, wherein the at least one polymer is an unwanted polymer that is generated during the monomer production process due to thermal polymerization of the monomer.

* * * * *